(No Model.) 5 Sheets—Sheet 1.
R. H. HASSLER.
ALTERNATING CURRENT ELECTRIC MOTOR.
No. 606,056. Patented June 21, 1898.
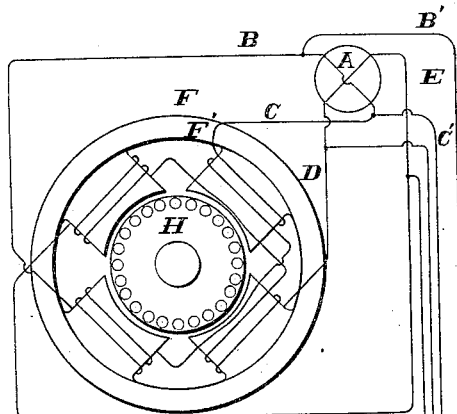
Fig.1.
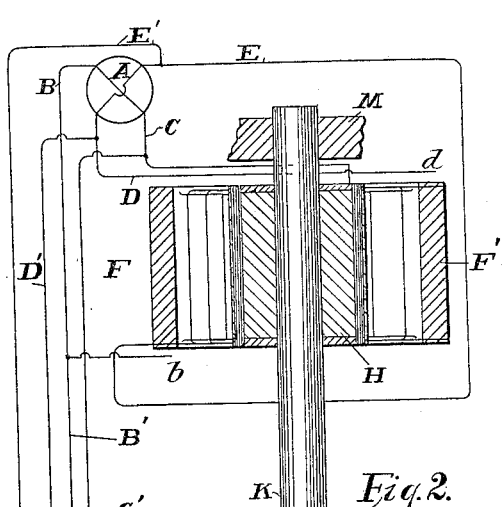
Fig.2.
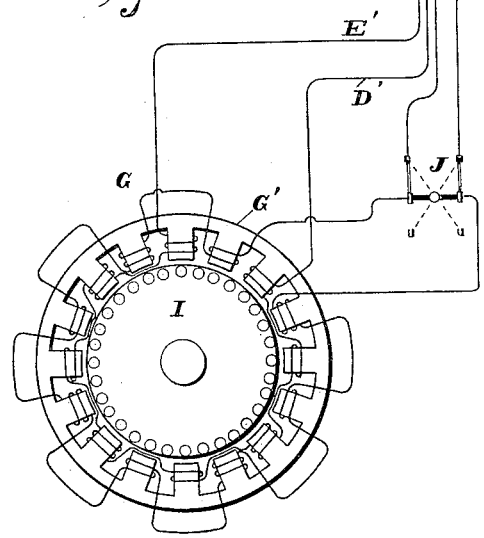
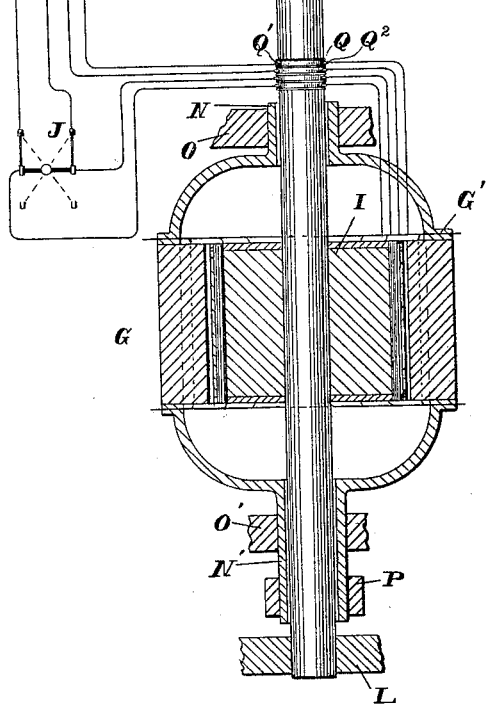
WITNESSES:
Ethan D. Dodds
Hubert C. Tener
INVENTOR
Robert H. Hassler
BY
Terry, MacFayne & Carr
ATTORNEYS.
THE NORRIS PETERS CO., PHOTO-LITHO., WASHINGTON, D. C.

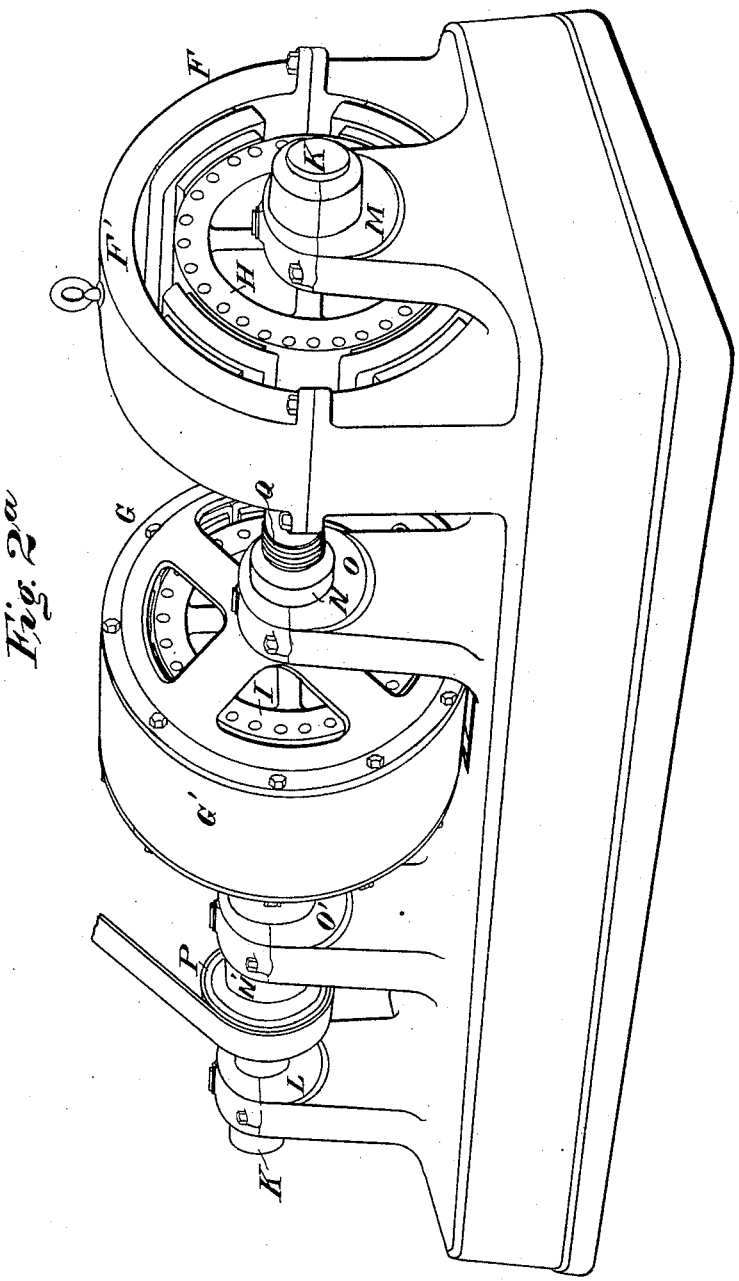

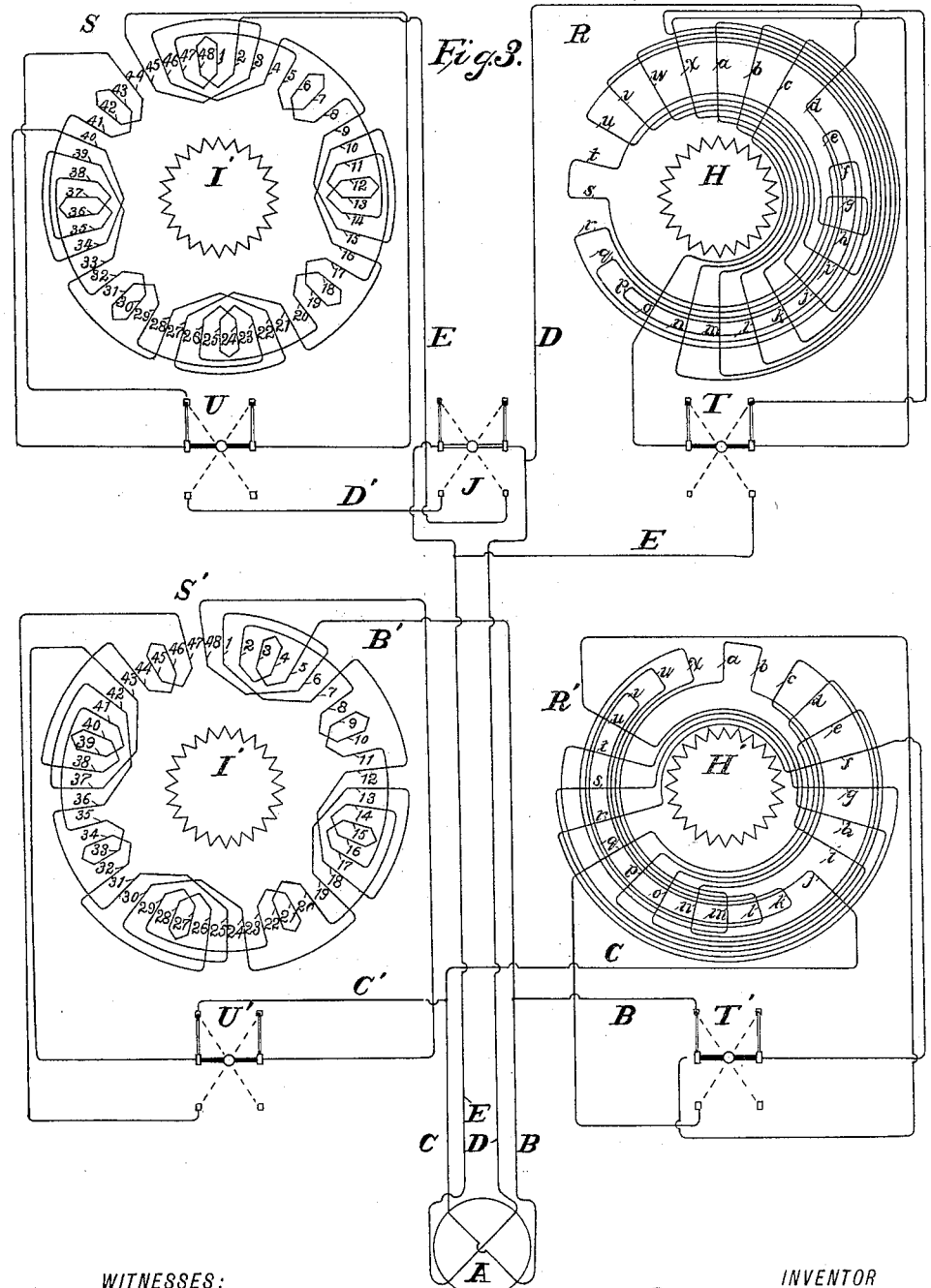

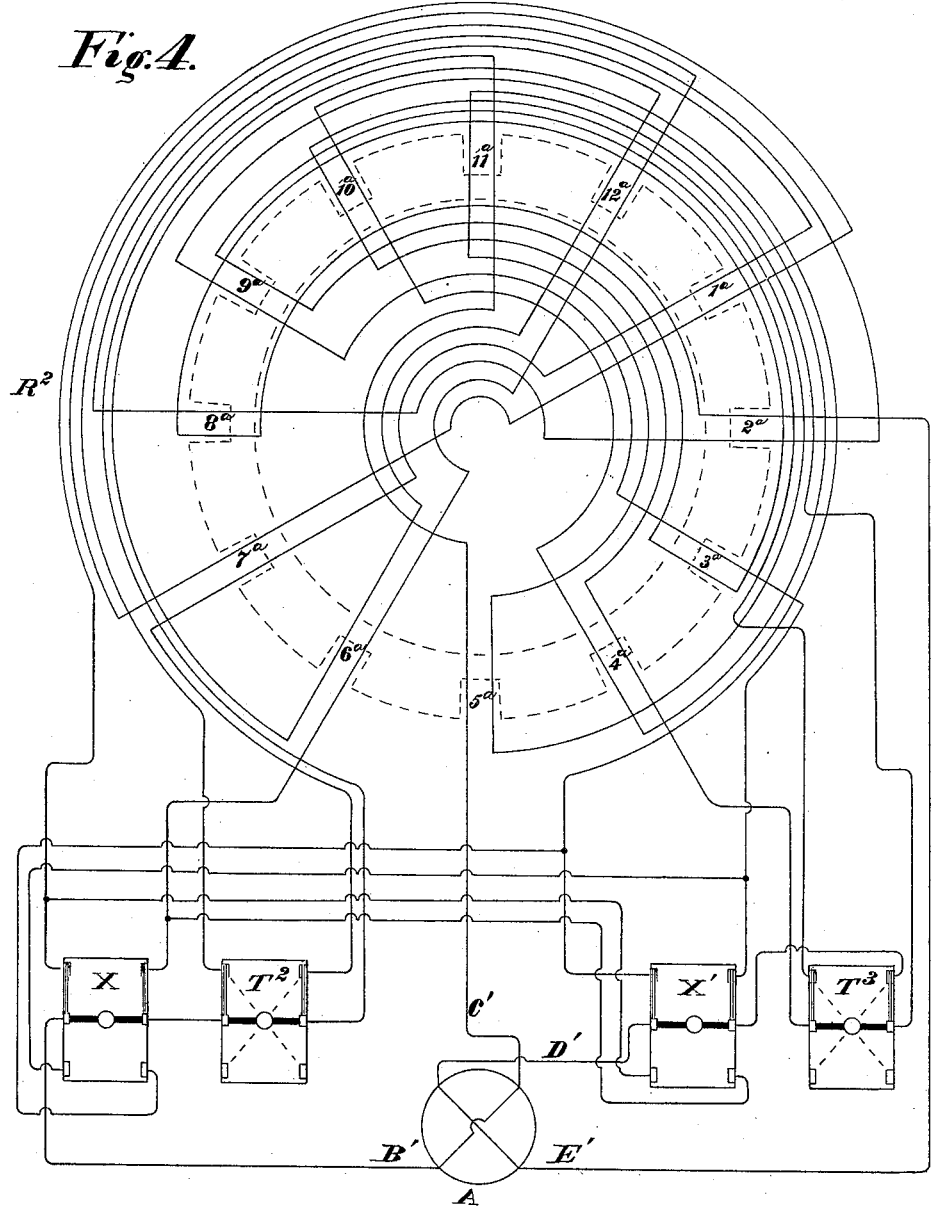

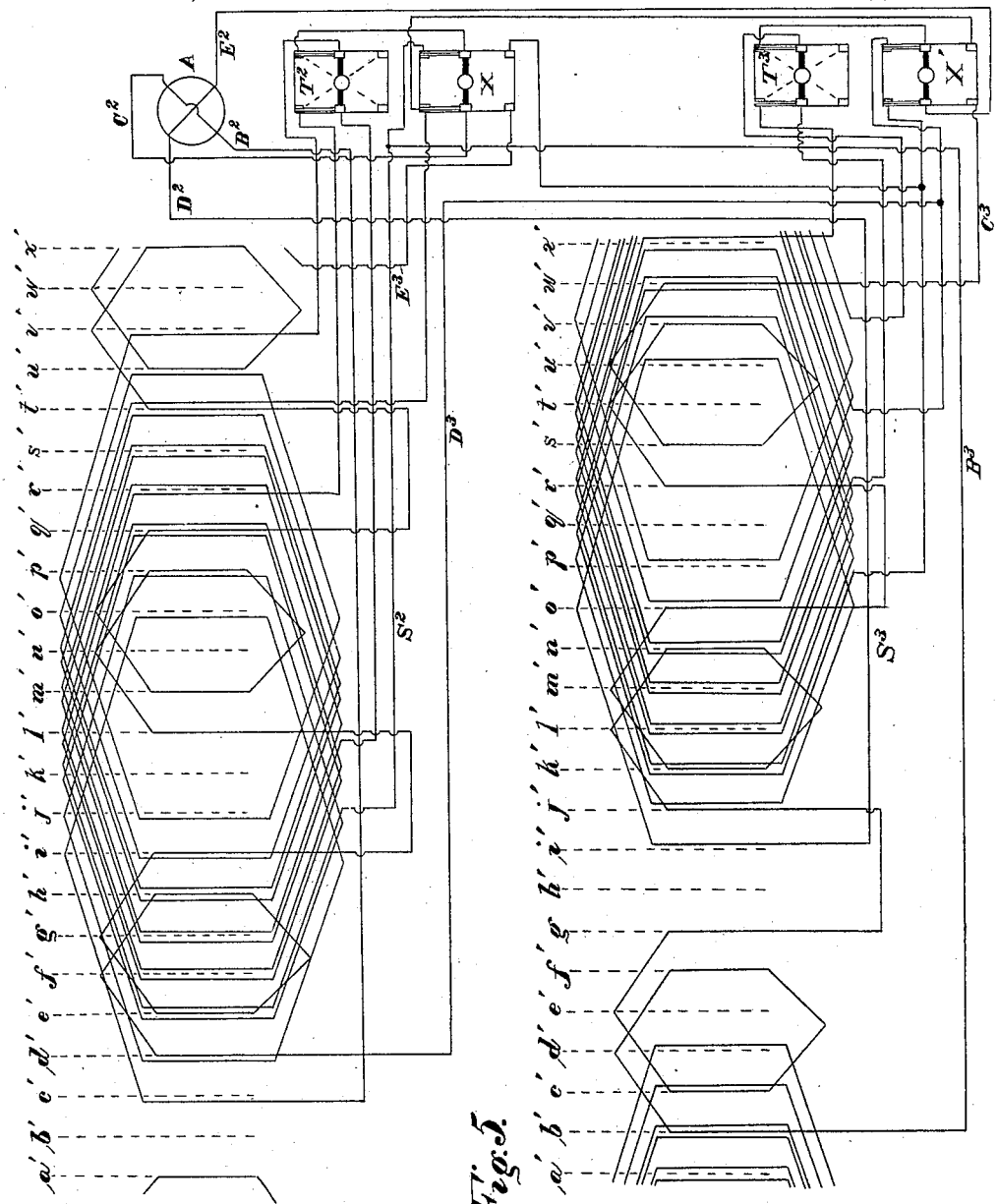

UNITED STATES PATENT OFFICE.

ROBERT H. HASSLER, OF PITTSBURG, PENNSYLVANIA, ASSIGNOR TO THE WESTINGHOUSE ELECTRIC AND MANUFACTURING COMPANY, OF PENNSYLVANIA.

ALTERNATING-CURRENT ELECTRIC MOTOR.

SPECIFICATION forming part of Letters Patent No. 606,056, dated June 21, 1898.

Application filed September 6, 1895. Serial No. 561,676. (No model.)

*To all whom it may concern:*

Be it known that I, ROBERT H. HASSLER, a citizen of the United States, residing at Pittsburg, in the county of Allegheny and State of Pennsylvania, have invented a new and useful Improvement in Alternating-Current Electric Motors, (Case No. 667,) of which the following is a specification.

My invention relates to alternating-current electric motors, and particularly to that class of devices known as "induction-motors," in which the current supplied to the primary member produces a magnetic field which acts inductively upon a closed-circuit secondary member in such a manner as to produce rotation of one or both of the said members.

The object of my invention is to provide a method and means whereby a shaft or axle or other rotatable body may be rotated economically and efficiently at different speeds.

It is well known that induction-motors as usually constructed have a high degree of efficiency when running at normal speed near synchronism and that they are very much less efficient when first started and when running at low speeds. This low degree of efficiency at the start and at low speeds is due to the unavoidable losses in the secondary member when the alternations in the magnetic field of such member are high. In some applications of this class of motors, notably in traction work, where there is necessarily much starting and stopping and running at different speeds, this loss in efficiency is a great disadvantage. My present invention is designed to overcome in a large degree the disadvantages heretofore incident to the use of induction-motors in such relations, and by its use I am enabled to secure a comparatively high degree of efficiency at all speeds which may be found desirable in practice.

In the accompanying drawings, Figure 1 is a diagram of two motors and their circuits constructed and arranged in accordance with one form of my invention. Fig. 2 is a horizontal longitudinal section through two motors and showing the mechanical and electrical connections between them, the electrical circuits and connections being shown diagrammatically. Fig. 2ª is a perspective view of the mechanism shown in Fig. 2. Fig. 3 is a diagram of a modification of circuits for two motors and their switches and connections. Figs. 4 and 5 are diagrams of modifications of primary circuits and pole-changing switches for induction-motors, the latter figure showing the winding as developed into a plane.

Reference being now had to Figs. 1, 2, and 2ª of the drawings, A is an electric generator, here shown as a generator of two-phase currents, although for certain conditions a generator of a different number of phases may be employed, if desired. The leads from the generator A are connected, by means of the conductors B C and D E, with the coils on the primary member F' of the motor F, and by the conductors B' C' and D' E' with the coils on the primary member G' of the motor G, the conductors B and D being shown in Fig. 2 as broken off at $b$ and $d$, respectively. While I prefer to connect the circuits of the two primary members of the motors F and G in parallel, as indicated, they may be connected in series, if desired, and hence I do not desire to limit the invention to the particular connection shown. Motor F is provided with four inwardly-projecting radial pole-pieces, on which are wound the coils connected with the conductors B C and D E, there being thus produced a rotating magnetic field having two poles for each phase. This rotating magnetic field acts upon a closed-circuit armature H. The primary member G' is provided with sixteen inwardly-projecting pole-pieces, on which are wound two sets of alternately-arranged coils connected, respectively, with the conductors B' C' and D' E', by means of which a rotating magnetic field is produced having eight poles for each phase, which act upon a closed-circuit armature I. I do not desire to limit my invention to the specific number of poles shown in the drawings, since the number may be varied within considerable limits and the mechanism still be useful and operative for the purpose intended, the particular form, number, and arrangement of parts being intended merely to illustrate one of a variety of modifications in which the invention may be embodied in practice. In the circuit D'

E', I have included a switch J for the purpose of reversing this circuit, the object of this reversal being hereinafter stated. It will be readily understood without a detailed description of the switch that the two contact arms or blades are insulated from each other and that when in the position shown in the drawings the circuit will be through the upper stationary contacts and switch-arms and out, as indicated in full lines, and when these switch-arms are reversed in position the circuit will cross, by means of the conductors shown in dotted lines, to the lower stationary contacts and thence through the switch-arms and the conductors, thus reversing the circuit.

As indicated in Figs. 2 and 2ª, the secondary members H and I of the two motors are rigidly mounted upon a shaft K, the latter being mounted at its ends in bearings L and M. The primary member F' of the motor F is stationary, and the primary member G' of the motor G is so mounted as to be free to rotate independently, it being shown in the present instance as connected to sleeves or hollow shafts N and N', through which extends the shaft K. These hollow shafts or sleeves are respectively mounted in suitable stationary bearings O and O', and the shaft N' is provided with a suitable power-transmitting device P, which may be either a gear-wheel or a pulley, according to the requirements of the particular service in which the motor is to be employed.

In order to permit of the rotation of the member G' independently of the shaft K and the parts carried thereby, I provide the said shaft with four contact-rings Q, upon which bear two sets of suitable contact-brushes Q' and Q², the former being connected with the conductors B' C' and D' E', leading from the generator A, and the latter with the continuations of these conductors which connect with the coils of the primary member G' of the motor G. It will thus be seen that the shaft K and the members H and I may be rotated at any desired speed and the member G' and its bearing-sleeves or hollow shafts rotated at a different speed either in the same or in the opposite direction.

While I have illustrated and described the external members of the motors as those to which the alternating currents are supplied, I desire it to be understood that my invention is not limited to such an arrangement, as the inner rotating members H and I may be made the primary elements and have the alternating currents supplied thereto, the external members having the closed induced circuits, or one of the motors may have such arrangement of the parts and the other be arranged as shown in the drawings, if desired.

The operation of the apparatus thus far described is as follows, it being assumed that the reversing-switch J is in the position shown in the drawings: As the motor F has two and the motor G eight poles for each phase and they are excited by currents having the same number of alternations, they will obviously run at different speeds. Let us suppose, for example, that the primary current makes three thousand alternations per minute. The number of rotations of the magnetic field being equal to the number of alternations divided by the number of poles for each phase, motor F will tend to run at fifteen hundred revolutions per minute and motor G at three hundred and seventy-five revolutions per minute. As the two members H and I are rigidly connected together by means of the shaft K, they, with the shaft, will run at fifteen hundred revolutions if there is no load, and as the two magnetic fields revolve in the same directions the speed of the primary member G', and therefore that of the power-transmitting device P, will be equal to the difference between the speed of the shaft K and the speed at which the member G' tends to run by reason of the current supplied thereto, or eleven hundred and twenty-five revolutions per minute, its direction of rotation being the same as that of the shaft K. The two motors will then be at synchronism, as the speed of the secondary of the motor G with respect to its primary will be three hundred and seventy-five revolutions per minute.

The conditions above stated are theoretical and will vary somewhat in practice on account of the slip of the motors, more particularly when they are working under load. If now we reverse the circuit B' C' by means of the switch J, the magnetic fields of the two motors will revolve in opposite directions and the resultant speed of the member G' and its connected parts will therefore be the sum of fifteen hundred and three hundred and seventy-five, or eighteen hundred and seventy-five revolutions per minute, the two motors being again running in synchronism, but the relative speed of the members I and G' will be the reverse of that above described, as has already been stated. It will thus be seen that with this combination and arrangement of two motors and a reversing-switch I am enabled to run the power-transmitting device P at two widely-different speeds and at the same time maintain a comparatively high degree of efficiency.

It will also be understood from the foregoing illustration and description that various other speeds within practical limits may be secured without impairing the efficiency of the motors by varying the number of magnetic poles of either or both of the primary members. For example, if the number of poles of the motor F be increased to six for each phase, so that its synchronous speed is reduced to five hundred revolutions per minute, the resulting speed of the shaft N' will be either one hundred and twenty-five revolutions per minute or eight hundred and seventy-five revolutions per minute, depending upon the relative direction of the two rotating magnetic fields controlled by the switch J. Again, if the number of poles on the motor G be increased to twenty-four for each phase, then with six poles on motor F the speed of shaft N' will be either six hundred and twenty-five revolutions per minute or three hundred and seventy-five revolutions per minute, depending upon the position of the switch J. With twenty-four poles on motor F and two poles on motor F the speed of the shaft N' will be either thirteen hundred and seventy-five or sixteen hundred and twenty-five revolutions per minute, depending upon the position of the switch J.

It is not feasible to make the changes in the number of poles necessary for the different speeds enumerated above in motors constructed as indicated in Figs. 1, 2, and 2ª, as the exciting-coils are arranged upon projecting pole-pieces. These changes in the number of poles may be effected, however, if the primary members or elements be constructed without projecting pole-pieces and the winding be distributed in slots. I have shown such an arrangement diagrammatically in Fig. 3, in which R and R' represent, respectively, the circuits for the two phases of current in the primary member of the first motor and S and S', respectively, the circuits for the two phases of current in the primary member of the second motor. The conductors of the two windings of each motor will be arranged in the same slots; but in order to avoid confusion they have been separated in the drawings. In this figure, H' represents the closed-circuit secondary member of the first motor and I' the corresponding member of the second motor. In this figure the generator A, the switch J for reversing the circuit S of the second motor, and the conductors B C, B' C', D E, and D' E', leading from the generators to the motors, are constructed and arranged substantially the same as corresponding elements shown in Figs. 1 and 2 of the drawings. In this figure of the drawings I have indicated the location of those portions of the conductor which lie in the slots by radial lines, the connections between these radial portions being indicated by circumferential and transverse straight lines. In the circuits R and R' the radial lines, which represent the location of those portions of the conductor which determine by the direction of the current flowing through them the magnetic poles, I have designated as $a\ b\ c\ x$, the arrangement being such that the poles produced by the conductors in circuit R shall be displaced in phase ninety degrees with reference to those produced by the conductors in the circuit R', the poles of the circuit S being also displaced in phase ninety degrees with reference to those produced by the conductors in the circuit S'.

The switches T and T' and U and U' are employed for the purpose of changing the number of poles in the two motors, as will be hereinafter more fully set forth. Assuming the switches T and T' to be in the position shown in the drawings, at any given instant the current flows in one direction through the conductors of circuit R at $a, b, c, d, e, f, g, t, u, v, w,$ and $x$ and in the opposite direction through the conductors at $h, i, j, k, l, m, n, o, p, q, r,$ and $s$, thus producing two magnetic poles. With the same arrangement of the switch T' the current in the circuit R', which differs in phase a quarter-period from that in the circuit R, will flow through the conductors at $b, c, d, e, f, g, h, i, j, k, l,$ and $m$ and in the opposite direction through the conductors at $n, o, p, q, r, s, t, u, v, w, x,$ and $a$, thus producing two magnetic poles which are displaced in phase ninety degrees from those in the circuit R. If now the switches T and T' be reversed, so that the movable blades or contact-arms shall be in engagement with the lower stationary contacts, current will flow at any given instant in the circuit R in one direction through the conductors at $x\ a\ b\ c, h\ i\ j\ k, p\ q\ r\ s$ and in the opposite direction through the conductors at $d\ e\ f\ g, l\ m\ n\ o, t\ u\ v\ w$, thus producing six magnetic poles. In the same manner a current differing by a quarter-period from that in the circuit R will flow through the conductors of the circuit R' at $b\ c\ d\ e, j\ k\ l\ m, r\ s\ t\ u$ in one direction and in the opposite direction through the conductors at $f\ g\ h\ i, n\ o\ p\ q, v\ w\ x\ a$, thus producing six magnetic poles which are displaced in phase ninety degrees from those in the circuit R.

Referring now to circuits S and S', with the switches U and U' in the position shown in the drawings, the current at any given instant in the circuit S will be in one direction through the conductors at 1 2 3 4 5 6, 13 14 15 16 17 18, 25 26 27 28 29 30, 37 38 39 40 41 42 in one direction and through the conductors at 7 8 9 10 11 12, 19 20 21 22 23 24, 31 32 33 34 35 36, 43 44 45 46 47 48 in the other direction, thus producing eight magnetic poles. In the same manner the current through the conductors in the circuit S' will produce eight poles which will be displaced ninety degrees in phase from those in the circuit S, such poles being located at 4 9, 10 15, 16 21, 22 27, 28 33, 34 39, 40 45, and 46 3. If now the switches U and U' be reversed, the circuit S will produce twenty-four magnetic poles by means of the current through the conductors at 1 2 5 6 9 10, &c., in one direction and in the opposite direction through the conductors at 3 4 7 8 11 12, &c. In the circuit S' the current will flow in the same direction through conductors at 2 3 6 7 10 11, &c., and in the opposite direction through the conductors at 4 5 8 9 and 12 13, &c., thus producing twenty-four magnetic poles which are displaced in phase ninety degrees with reference to the poles produced by the current in the circuit S.

It will be observed that whatever may be the smaller number of poles in the primary member of the motors illustrated in the drawings the larger number is three times the smaller—that is to say, the number of poles is either $x$ or $3x$. This arrangement permits of the employment of a winding all of the coils of which embrace spaces of the same width. The end connections may therefore be uniform and the winding symmetrical. I do not intend to limit my invention to this particular arrangement, however, since a construction in which the ratio of the smaller to the larger number of poles is different from that illustrated is feasible and useful.

It will obviously be necessary to throw the switches T and T' at the same time in order to have the same number of poles in both circuits of the same motor, and for the same reason it will be necessary to throw the switches U and U' at the same time. In practice they may be connected in such manner that they must of necessity be operated together.

The method of changing the number of poles hereinbefore set forth may be employed advantageously in connection with the usual forms of induction-motors for some classes of work, and it may be found desirable in practice to employ auxiliary windings for one number of poles and cut the same out of circuit when a different number of poles is desired, or auxiliary windings may be employed which can be thrown from one phase to the other when the number of poles is changed. Such modifications I have illustrated in Figs. 4 and 5, to which reference will now be made.

In Fig. 4, A is a two-phase generator supplying currents to the primary member $R^2$ of an induction-motor through leads B' C' and D' E'. X X' and $T^2$ $T^3$ are the switches employed for changing the number of poles in the motor. The approximately radial portions of the conductors which determine the number and position of the poles are located in slots in the core, as indicated diagrammatically, there being two such conductors in each slot. These slots are designated as $1^a$ $2^a$ $3^a$ $4^a$ $12^a$. When the switches are in the "up" position indicated in the drawings, the current through the leads D' C' at a given instant will be in one direction in both conductors in slots $1^a$ and $12^a$, in the lower conductor in slot $2^a$, and in the right-hand conductor in slot $11^a$, and in the opposite direction in both conductors in slots $6^a$ and $7^a$, in the upper conductor in slot $8^a$, and in the left-hand conductor in slot $5^a$. For the other phase of current represented by the leads D' and E' and the same position of the switches the current at a given instant will be in one direction in both conductors in slots $3^a$ and $4^a$, in the upper conductor in slot $2^a$, and in the right-hand conductor in slot $5^a$, and in the opposite direction in both conductors in slots $9^a$ and $10^a$, in the lower conductor in slot $8^a$, and in the left-hand conductor in slot $11^a$, thus producing two poles for each phase. If now all of the switches be thrown so that the movable members are in the "down" position, the phase of current represented by leads B' C' will at a given instant be in the same direction in the upper conductor in slot $1^a$, the lower conductor in slot $2^a$, the left-hand conductors in slots $5^a$ and $6^a$, the lower conductor in slots $9^a$ and $10^a$, and in the opposite direction in the upper conductor in slot $3^a$, the left in slot $4^a$, the lower at $7^a$ and the upper at $8^a$, the right at $11^a$ and the left at $12^a$. For the other phase the current will be in the same direction in the remaining conductors in slots $2^a$ and $3^a$, $6^a$ and $7^a$, $10^a$ and $11^a$, and in the opposite direction in the remaining conductors in slots $1^a$ and $12^a$, $4^a$ and $5^a$, $8^a$ and $9^a$, thus producing six poles for each phase. In throwing the switches for producing this change in the number of poles it will be observed that one of the conductors in each of slots $1^a$, $3^a$, $4^a$, $6^a$, $7^a$, $9^a$, and $12^a$ is thrown to the opposite phase.

In Fig. 5 the two-phase generator A is connected with the main primary winding of the motor by means of the leads $B^2$ $C^2$ and $D^2$ $E^2$, and four switches X X' and $T^2$ $T^3$, like those shown in Fig. 4, are employed in changing the number of poles and throwing certain portions of winding from one phase to the other. To avoid confusion, the windings $S^2$ and $S^3$ for the two phases of current, when the smaller number of poles is employed, are shown separately. The positions of the conductors corresponding to the core-slots (not shown) are represented by the letters $a$ $a'$, $b$ $b'$, $x$ $x'$. With the switches in the position shown in the drawings the current represented by the leads $B^2$ $C^2$ will at a given instant be in one direction in winding $S^2$ through both conductors at $e'$, $f'$, $g'$, and $h'$, and through one of the conductors at $c'$, $d'$, $i'$, and $j'$, and in the opposite direction through both conductors at $q'$, $r'$, $s'$, and $t'$ and through one of the conductors at $o'$, $p'$, $n'$, and $b'$. For the other phase of current represented by the leads $D^2$ $E^2$ the current at a given instant will be in one direction through both conductors of winding $S^3$ at $k'$ $l'$ $m'$ $n'$ and through one conductor at $i'$, $j'$, $o'$, and $g'$, and in the opposite direction through both conductors at $a'$, $b'$, $w'$, and $x'$ and through one of the conductors at $c'$ $d'$ $u'$ $v'$, thus producing two magnetic poles for each phase of current. If the switches be thrown to the opposite or down position, the current of the phase represented by $B^2$ $C^2$ will be in one direction through one of the conductors at $c'$, $d'$, $e'$, and $f'$ of winding $S^2$, $k'$, $l'$, $m'$, and $n'$ of winding $S^3$, and $s'$, $t'$, $u'$, and $v'$ of winding $S^2$, and in the opposite direction through one of the conductors at $a'$ $b'$ $x'$ of winding $S^3$, $g'$, $h'$, $i'$, and $j'$ of winding $S^2$, and $o'$, $p'$, $q'$, and $r'$ of winding $S^2$. For the other phase represented by leads $D^2$ $E^2$ the current will be in one direction in one of the conductors at $a'$ $b'$ $c'$ $d'$ and $i'$, $j'$, $k'$, and $l'$ of winding $S^3$, and $q'$, $r'$, $s'$, and $t'$ of winding $S^2$, and in the opposite direction in one of the conductors at $e'$ $f'$ $g'$ $h'$ of winding $S^2$, and $m'$ $n'$ $o'$ $p'$ and $u'$, $v'$, $w'$, and $x'$ of winding $S^3$, thus producing a six-pole field for each phase. With the switches in the down position just described an auxiliary winding for each phase connected with the generator through the switches by means of leads $B^3$ $C^3$ $D^3$ $E^3$ will be thrown in circuit to supplement the other windings. This auxiliary winding is cut out of circuit when the switches are in the up position. The auxiliary winding coöperating with the winding $S^2$ will at the instant of current in the main winding corresponding to that above described have current in one direction at $d'\,e'$, $l'\,m'$, and $t'\,u'$ and in the opposite direction at $a'\,x'$, $h'\,i'$, and $p'\,g'$. The other auxiliary winding coöperates with winding $S^2$ by means of current in one direction at $b'\,c'$, $j'\,k'$, and $r'\,s'$ and in the opposite direction at $f'\,g'$, $n'\,o'$, and $v'\,w'$.

I desire it to be understood that my invention is not limited to the specific construction and arrangement of coils shown or to any specific number of pole-changing switches and circuits.

I claim as my invention—

1. The combination with two alternating-current induction-motors, one of which comprises primary and secondary independently-movable members, and the other, primary and secondary members, one of which is movable and the other stationary, one of said primary members having a greater number of magnetic poles than the corresponding member of the other motor, of means for mechanically connecting one of the members of the first motor with the movable member of the second, a source of alternating currents and means for electrically connecting the primary member of each motor with said source of currents.

2. The combination with two alternating-current induction-motors, one of which comprises two independently-movable members, and the other, a stationary and a movable member, of means for mechanically connecting one of the members of the first motor with the movable member of the second, a source of alternating currents, means for electrically connecting the primary member of each motor with said source of currents, and a switch for reversing one of the circuits.

3. The combination with two induction-motors, one comprising two independently-movable members and the other a stationary and a movable member, of means for mechanically connecting one of the members of the first motor with the movable member of the second, means for electrically connecting one member of the first with one member of the second, and means for varying the number of poles on one or both of the primary members.

4. The combination with two polyphase induction-motors having rotatable members which are mechanically connected to rotate at the same speed, and means for electrically connecting one member of one motor to one member of the other, of means for reversing one of the circuits and means for varying the number of magnetic poles in either or both of the primary members.

5. The method of controlling the speed of a rotating shaft or axle which consists in subjecting the same to the resultant torque of two rotating magnetic fields for one rate of speed and changing the number of poles of one of said rotating fields for a different rate of speed.

6. The method of varying the speed of a rotating shaft or axle which consists in subjecting the same to the resultant torque of two rotating magnetic fields having a different number of poles for one rate of speed, and changing the number of poles of either or both of said rotating fields for different rates of speed.

7. The method of regulating the speed of rotation of a shaft or axle which consists in subjecting the same to the resultant torque of two rotating magnetic fields having a different number of poles for one rate of speed and changing the direction of rotation of one of said fields for a different rate of speed.

8. The method of regulating the speed of rotation of a shaft or axle which consists in subjecting the same to the resultant torque of two rotating magnetic fields having a different number of poles for one rate of speed, reversing the direction of rotation of one of the fields and changing the number of poles of either or both of said fields for different rates of speed.

9. In an induction-motor, the combination of a primary member provided with slots and with distributed windings therein, a circuit-changing device, leads for each phase of current, less in number than the slots, connected through such circuit-changing device to such windings, the windings being so arranged and connected to said leads that when the direction of current-flow therein is changed, the number of magnetic poles is changed, substantially as described.

10. In an induction-motor, the combination of a primary member provided with slots and with distributed windings therein, a circuit-changing device, leads for each phase of current, less in number than the slots, connected through such circuit-changing device to such windings, the windings being so arranged and connected to said leads that when the direction of current-flow therein is changed, the number of magnetic poles is changed from $x$ to $3x$ and vice versa, substantially as described.

In testimony whereof I have hereunto subscribed my name this 4th day of September, A. D. 1895.

ROBERT H. HASSLER.

Witnesses:
ALEXANDER JAY WURTS,
JOHN B. WHITEHEAD, Jr.